(12) United States Patent
Trainor et al.

(10) Patent No.: US 7,090,226 B1
(45) Date of Patent: Aug. 15, 2006

(54) GASKET FOR SEALING BETWEEN GLASS PANELS

(75) Inventors: Edwin J. Trainor, Orland Park, IL (US); Robert J. Heider, 124 Forestview Rd., Bensenville, IL (US) 60106

(73) Assignees: Doralco, Chicago, IL (US); Robert J. Heider, Bensenville, IL (US)

( * ) Notice: Subject to any disclaimer, the term of this patent is extended or adjusted under 35 U.S.C. 154(b) by 0 days.

(21) Appl. No.: 10/386,975

(22) Filed: Mar. 12, 2003

(51) Int. Cl.
*F16J 15/02* (2006.01)
*E04B 1/684* (2006.01)

(52) U.S. Cl. .................. 277/630; 277/645; 277/649; 277/921; 52/308; 52/395; 52/396.04; 52/396.06; 52/396.08; 52/396.09

(58) Field of Classification Search .............. 277/906, 277/921, 630, 645, 649; 52/468, 204.593, 52/395, 396.06, 204.62, 204.57, 471, 282.1, 52/396.1, 307, 308, 396.08, 396.04, 396.09; D25/121–123
See application file for complete search history.

(56) References Cited

U.S. PATENT DOCUMENTS

| | | | | |
|---|---|---|---|---|
| 2,141,000 A * | 12/1938 | Hohl | ..................... | 52/308 |
| 2,156,681 A * | 5/1939 | Dewhirst et al. | ............. | 404/65 |
| 2,228,052 A * | 1/1941 | Gardner | ..................... | 52/396.3 |
| 2,230,303 A * | 2/1941 | Leguillon | ..................... | 404/65 |
| 2,230,688 A * | 2/1941 | Gavotte | ..................... | 404/65 |
| 2,835,360 A * | 5/1958 | Bernardoni et al. | ..... | 52/204.62 |
| 2,835,623 A * | 5/1958 | Harvard et al. | ............. | 156/213 |
| 2,956,314 A * | 10/1960 | Rowe et al. | ............. | 62/204.57 |
| 3,039,232 A * | 6/1962 | Dunn | ..................... | 52/396.04 |
| 3,092,877 A * | 6/1963 | Perilstein | ............... | 52/204.595 |
| 3,137,973 A * | 6/1964 | Williams | ................. | 52/396.09 |
| 3,162,906 A * | 12/1964 | Dudley | ......................... | 52/97 |
| 3,234,699 A * | 2/1966 | Smith | ........................ | 52/308 |
| 3,286,425 A * | 11/1966 | Brown | ................... | 52/396.06 |
| 3,292,330 A * | 12/1966 | Tennison | ................. | 52/396.09 |
| 3,488,828 A * | 1/1970 | Gallagher | ..................... | 29/451 |
| 3,508,369 A * | 4/1970 | Tennison | ................. | 52/396.08 |
| 3,604,169 A * | 9/1971 | Smith | ...................... | 52/396.04 |
| 3,709,115 A * | 1/1973 | Brown | ........................ | 404/65 |
| 3,866,374 A * | 2/1975 | Dallen | ................... | 52/204.597 |
| 4,119,387 A * | 10/1978 | Brown | ........................ | 404/69 |
| 4,352,520 A * | 10/1982 | Stiglmaier et al. | ......... | 296/204 |
| 4,635,420 A * | 1/1987 | Batky | ........................ | 52/309.1 |
| 4,691,489 A * | 9/1987 | Shea, Jr. | ...................... | 522/35 |
| D299,869 S * | 2/1989 | Green | ...................... | D25/123 |
| 4,916,878 A * | 4/1990 | Nicholas | ................. | 52/396.06 |
| 4,986,048 A * | 1/1991 | McMarlin | .................... | 52/306 |
| 5,010,704 A * | 4/1991 | Thompson | .................. | 52/308 |
| 5,031,372 A * | 7/1991 | McCluer | ..................... | 52/307 |

(Continued)

*Primary Examiner*—Alison K. Pickard
(74) *Attorney, Agent, or Firm*—Greer, Burns & Crain, Ltd

(57) ABSTRACT

An insert, or gasket, intended to be used at a joint between two panels. The insert is preferably pre-formed into a particular cross-sectional shape such that it can be easily, and securely, installed between two panels. Preferably, the insert is shaped, in cross-section, with one flange on each end, such that upon installation, one flange is seated on the front side of the panels and the other flange is seated on the rear side of the panels. In the preferred embodiment, the first and second flange portions may include a pair of lips, and the lip of the second flange portion is of a thickness that is greater than that of the lip of the first flange portion. Such a configuration facilitates installation. The present invention also relates to a method of installing such an insert.

4 Claims, 1 Drawing Sheet

U.S. PATENT DOCUMENTS

| | | | |
|---|---|---|---|
| 5,042,211 A * | 8/1991 | Nestler | 52/396.06 |
| 5,155,952 A * | 10/1992 | Herwegh et al. | 52/100 |
| 5,448,864 A * | 9/1995 | Rosamond | 52/307 |
| 5,490,358 A * | 2/1996 | Grunewald et al. | 52/235 |
| 5,655,345 A * | 8/1997 | Thompson | 52/396.1 |
| 5,655,346 A * | 8/1997 | Holmes et al. | 52/476 |
| 5,806,272 A * | 9/1998 | Lafond | 52/786.13 |
| 6,102,407 A * | 8/2000 | Moriya et al. | 277/316 |
| 6,219,982 B1 * | 4/2001 | Eyring | 52/396.04 |
| 6,336,300 B1 * | 1/2002 | Babucke | 52/396.04 |
| 6,363,677 B1 * | 4/2002 | Chen et al. | 52/586.1 |
| 6,675,543 B1 * | 1/2004 | LeMert | 52/308 |
| 6,770,690 B1 * | 8/2004 | Fujiki et al. | 523/205 |

* cited by examiner

GASKET FOR SEALING BETWEEN GLASS PANELS

The present invention relates generally to an insert for use between two panels, and more particularly to a gasket that can be inserted in the space between two glass panels of a full or partial height partition.

BACKGROUND OF THE INVENTION

Architects, designers, and others frequently utilize partial or full height glass partitions in both commercial and residential spaces. Such partitions may be made from several panels. Although they are often made of glass, other materials have been used. In order to create the desired aesthetic effect, the panels are often framed at only the top and bottom (and sometimes at the outermost edges), so that adjacent panels are positioned edge-to-edge with small spaces between panels, which are commonly referred to as butt-joints.

In order to reduce the level of noise, sound, odor, smoke, etc. that passes through the space or joint between panels, the joint is ordinarily sealed. Commonly, the joint is sealed by filling it with liquid silicone dispensed from a caulk gun or a tube. The silicone then hardens in place, forming a barrier that prevents, or at least minimizes, the transfer of air and sound through the joints between panels.

However, there are several drawbacks to caulking liquid silicone. For example, the resulting silicone bead may have cosmetic problems, such as air bubbles or shape deformities. The shape of the bead may be deformed for a variety of reasons, such as from the traces created by stopping and re-starting the caulk gun, or the bead may be too thick or too thin in certain places. Basically, the aesthetic quality of the silicone bead greatly depends upon the skill level of the person doing the caulking.

Moreover, silicone caulking is labor intensive, not only during the actual caulking, but also during the preparation of the surface and the clean-up. For example, prior to caulking, the joints need to be taped-off to prevent silicone from getting on the front and rear surfaces of the glass panel. During caulking, the bead needs to be "tooled" from both sides of the partition simultaneously, thereby requiring two craftsmen. Finally, after caulking, empty silicone tubes or cartridges, as well as the cloths or paper towels that are used to periodically remove the excess caulk from the tools, and any other waste needs to be collected and removed. Tools and waste that contain caulk may contact the floors, adjacent walls or other surfaces, possibly damaging these surfaces, or at minimum creating other areas to clean.

In addition, silicone caulk is difficult to remove from unintended surfaces surrounding the space being caulked. Furthermore, in some applications, once installed, the silicone caulk cannot be removed without leaving an unsightly condition. Even if removal is not an issue, clear silicone caulk can sometimes create blemishes on the edges of laminated glass, requiring replacement of the glass. Also, the caulking process creates an unpleasant odor.

There are also other drawbacks associated with the use of caulked silicone in certain applications. For example, in showcases, both sides of the partition are visible, but only one side is often readily accessible for someone to tool the caulk bead. Accordingly, the non-accessible side is either left un-tooled, or alternate methods of tooling are devised. Another drawback of using silicone caulk for butt-jointed glass is that tape cannot be applied to sandblasted glass for a period of thirty days after the necessary sealer is applied. Accordingly, the caulk normally cannot be installed at the same time that the partition is installed and sealed, which increases costs because a separate trip to the site is required.

BRIEF SUMMARY OF THE INVENTION

The present invention provides an alternative to caulking. More specifically, the present invention provides an insert intended to be used at a joint between two panels. The insert is preferably pre-formed into a substantially rectangular, hollow cross-sectional shape such that it can be easily compressed and installed between two panels. Preferably, the insert, in cross-section, has one flange on each end, such that upon installation, one flange is seated on the front side of the panels and the other flange is seated on the rear side of the panels.

More specifically, the insert preferably includes a main body portion including a first end and a second end; a first flange portion located on the first end of the main body portion, with the first flange portion including a least one lip extending from a side thereof; and a second flange portion located on the second end of the main body portion, with the second flange portion also including at least one lip. Preferably, the lip of the second flange portion is of a thickness that is greater than that of the lip of the first flange portion. Also, it is preferred that the first and second flange portions each include a pair of lips.

The present invention also relates to a method of installing a pre-formed insert between two panels. Preferably the pre-formed insert includes a main body portion with a first end and a second end, a first flange portion located on the first end of the main body portion, and a second flange portion located on the second end of the main body portion. The first flange portion preferably includes a least one lip extending from a side thereof, and the second flange portion preferably includes at least one lip also. The method preferably includes the steps of: aligning two panels side-by-side to define a space between the edges of each panel; and feeding the pre-formed insert into the space from a front side of the panels by pressing the first flange portion into the space. In the preferred embodiment, the pre-formed insert is pressed into the space until the first flange portion reaches the rear side of the panels, and the second flange portion comes into contact with the front surfaces of the panels.

BRIEF DESCRIPTION OF THE SEVERAL VIEWS OF THE DRAWINGS

Preferred embodiments of the present invention are described herein with reference to the drawings wherein.

DETAILED DESCRIPTION OF THE INVENTION

Figure 1:
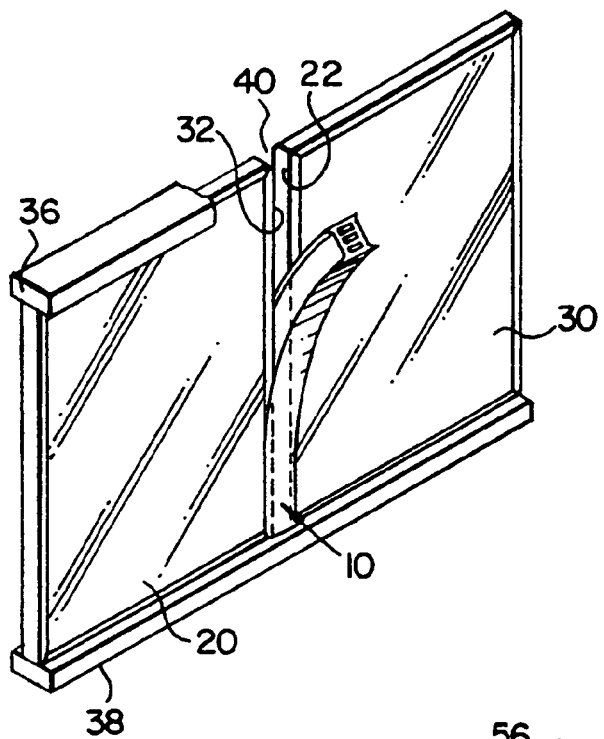
FIG. 1 is a front perspective view of two glass panels shown with an embodiment of the insert of the present invention being installed therebetween.
Figure 2:
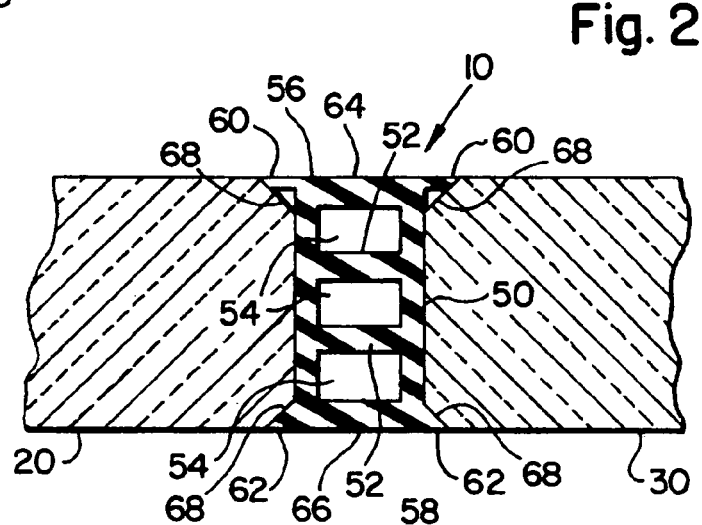
FIG. 2 is a cross-sectional view showing an embodiment of the present insert installed between two glass panels.
Figure 3:
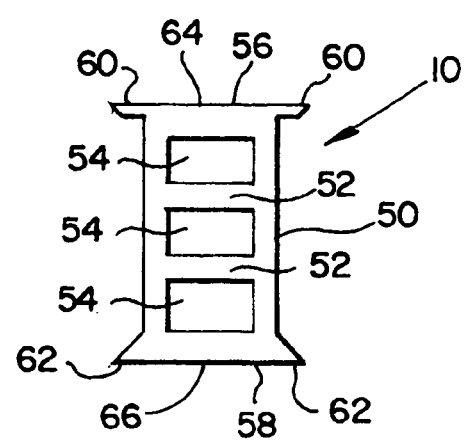
FIG. 3 is a cross-sectional view showing an embodiment of the present insert in a free state.

Referring now to the drawings, one preferred embodiment of the present invention is shown in FIGS. 1–3. FIG. 1 shows a preferred embodiment of the insert 10 (also referred to as gasket 10) being installed between two glass panels 20 and 30. Although glass panels are shown and described, it should be noted that the present invention may also be used with panels made of other materials, such as metal, rigid plastic, etc. As shown, the glass panels 20 and 30 are aligned next to each other with the corresponding edges 22 and 32 facing each other. In this embodiment, panels 20 and 30 are supported in place by frame pieces 36 and 38. In FIG. 1, frame piece 36 is shown partially cut-away so that the seating surfaces of the insert 10 can be viewed without obstruction. Frame piece 38 is secured to the floor using customary affixing means such as screws, bolts, etc. In this embodiment, the frame is only provided on the top and bottom of the panels 20 and 30, but, if desired, frame pieces may also be added to the outer edges of the panels. Also, in this example, only two panels are shown. However, many more panels can be added, if desired, and an insert 10 can be provided at each joint between panels. In addition, it is also contemplated that the frame can be omitted, and the plurality of panels could be affixed directly to a wall, with an insert 10 provided at each joint between panels.

The glass panels 20 and 30 are arranged so that a space 40 is defined between respective edges 22 and 32. FIG. 1 depicts a partially installed insert 10. During installation, the insert 10 is fed into the space 40 created between panels 20 and 30, starting at one end and continuing until the insert 10 is completely installed. Preferably, a long length of insert is provided on a roll, or is simply coiled around itself, and the proper amount of insert is cut after the bulk of the length of the insert has been installed. However, if desired, precut lengths of insert may also be used. Further, the particular cross-sectional shape of the preferred embodiment of the insert advantageously may be installed without application tools, although it is also contemplated that an application tool could be used, if desired.

Details of the shape of the insert 10 will be described with reference to FIGS. 2 and 3. FIG. 2 shows a cross-section of the insert 10 positioned between two panels 20 and 30, and FIG. 3 shows a cross-section of the insert 10 in a free state.

In the preferred embodiment, the insert 10 includes a main body portion 50 that is preferably of a hollow configuration to allow for the insert 10 to be compressed slightly between the edges 22, 32 of the panels. However, it is also contemplated that that main body portion 50 could be solid (if a resilient, compressible material is used), or that the hollow main body portion 50 of a first material could be filled with a second material of higher or lower compressibility than that of the main body portion. In the embodiment shown and described, the insert is composed of silicone. Alternatively, other suitable, resilient, elastomeric materials could be used. Preferably, the insert 10 is extruded into the cross-sectional shape shown. Since the insert is preferably extruded or otherwise pre-formed of silicone, there are no compatibility problems with laminated glass, whereas a caulked silicone bead may cause blemishes on laminated glass. Silicone is also compatible with common glass cleaners.

In the preferred embodiment, the main body portion 50 is of a hollow generally rectangular configuration in cross-section. However, depending upon the shape of the edges of the panels, the main body portion could also be shaped differently to correspond to the shapes of the edges of the panels. Preferably, there is at least one supporting rib 52 that divides the main body portion into a plurality of chambers 54. As shown in FIG. 2, the chambers 54 provide an open area for the supporting ribs 52 to expand into when the insert 10 is compressed between glass panels 20 and 30. In this embodiment, two supporting ribs 52 are provided, dividing the main body portion into three chambers 54. However, a fewer or a greater number of supporting ribs can be provided, or the ribs can be omitted entirely, if desired.

The insert 10 also includes two flange portions 56 and 58 that are located on the opposite ends of the main body portion 50. These two flange portions each include at least one lip, but preferably a pair of lips 60 are included on flange portion 56 and a pair of lips 62 are included on flange portion 58. Lips 60 and 62 are configured to grip the edges of the panels to maintain the insert 10 in place during normal usage or cleaning.

Although a pair of lips is shown on each flange portion, it is contemplated that in certain applications only a single lip on each flange portion would be used, such as where the panel is the last one in a series and abuts against a frame, or if the panel abuts against a wall instead of against another panel. It is also contemplated that in certain situations, only one of the flanges will contain a lip (or pair of lips).

Preferably, the outer surfaces 64 and 66 of the flanges 56 and 58, respectively, are flat, as shown in FIGS. 2 and 3. When the insert 10 is installed, the outer surfaces 64 and 66 are preferably flush with the front and rear surfaces of the panels 20 and 30, as shown in FIG. 2. Preferably, the panels 20 and 30 each include a slight bevel 68 on both the front and rear sides of edges 22 and 32, which also aids in seating the insert 10 in a flush condition with respect to the panels 20 and 30. Also, the insert may be slightly compressed between panels 20 and 30, which causes the lips 60 and 62 to more closely grip the beveled edges 68 of the panels 20 and 30, thereby increasing the sealing ability of the insert.

As best shown in FIG. 3, the lips 60 on one end of the flange portion 56 are preferably thinner than the lips 62 of the other end of flange portion 58. For example, in an insert of approximately ½ inch thickness (where thickness is considered from top to bottom in FIG. 2), thick lips 60 may each be approximately 0.062 inches thick, and the thin lips 62 may each be approximately 0.020 inches thick. One suggested dimension for the amount that each of the lips extend outwardly from the main body portion 50 is approximately 0.0615 inches. Of course, other dimensions for all portions of the insert 10 are also contemplated as being within the scope of the invention.

When installing the insert 10 between the two panels 20 and 30, the side with the thin lips 60 is preferably inserted first. Insertion of the thin lips 60 is easier than insertion of the thicker lips 62. Also, the thicker lips 62 provide a "stop" for preventing the insert 10 from being inserted too deeply into space 40. However, if desired, the lips may be of equal thickness to avoid installer confusion as to which side should be inserted first.

For the purposes of illustration only, sample dimensions of the present insert will be provided. However, it should be understood that such dimensions are being provided by way of example only, and that other suitable dimensions could also be determined by those of ordinary skill in the art. Normally, the space 40 between panels will be approximately ¼ inch. Accordingly, to ensure that the insert 10 can be installed within such a space, even if the space 40 is slightly smaller that ¼ inch, due to normal construction tolerances, the width of the main body portion 50 should be slightly less than ¼ inch, for example 0.244 inch. However, if a space 40 of a size other than ¼ inch is used, the width of the insert should be changed accordingly to be slightly less than the average width of the space.

With regard to the height of the insert 10 (where the term "height" is used when considered from top to bottom in the views of FIGS. 2 and 3), the insert 10 is preferably equal to or slightly larger than the thickness of the panels 20 and 30. Thus, for example, for ½ inch thick panels, an insert of a height of 0.501 inches could be used; for ⅜ inch thick panels, an insert of a height of 0.376 inches could be used; and for ¼ inch thick panels, a 0.251 inch insert.

One of the advantages of the present invention is that it can be easily installed with a uniform appearance and with no air bubbles, and without the need for highly skilled personnel (otherwise required for caulking silicone). Furthermore, installation can be accomplished from one side of the panels. Accordingly, the present invention can be used in situations where caulking a silicone bead would be difficult or impossible. Moreover, with the one-sided installation of the present invention, only a single installer is required. Thus, the present invention offers more versatility than caulking, and also provides for a savings of labor costs because only a single installer of a relatively low skill level is required. Additional labor savings, when compared to caulking, are also realized when the gasket is installed between panels of sandblasted glass because the thirty day wait after sealing the sandblasted glass associated with silicone caulk is not required. Thus, the present gasket may be installed on the same day as sealing the sandblasted glass, thereby eliminating the need for a second site visit.

A further advantage of the present invention over caulking is that there are no empty caulk tubes, empty caulk cartridges, wet paper towels, tape, etc. that need to be disposed of. That is, installation of the present invention creates less waste than installing caulk.

Also, the insert 10 of the present invention is preferably installed without adhesives. The lips grip the edges of the glass panels, securely seating the insert 10 within the space 40 without the need for adhesives. Since adhesives are not required, the present invention does not have the problems associated with adhesives (such as clean-up, the need to carefully avoid getting the adhesive on unwanted areas). Also, without adhesives, there is no odor caused by the adhesives. In fact, the present insert 10 is essentially odor-free. In contrast, when caulking a bead of silicone, an unpleasant odor is usually created.

One of the advantages of the present invention is that after the insert has been installed, it can be easily removed, and then re-installed. Since the insert 10 is preferably made of a relatively resilient material, such as silicone, and no adhesives are needed to maintain the insert in place, the insert can be completely removed, in one piece, and then it can be re-installed. In contrast, removal of a caulked silicone bead is very difficult, or impossible, and often results in leaving an unsightly condition.

Another advantage of the present invention is a reduction in sound transmission. Applicants have done some preliminary testing, and have determined that the present invention provides an improvement in sound reduction when compared to a caulked silicone bead. For example, preliminary tests have shown that an insert of the embodiment shown in FIGS. 1–3 performs better at reducing the transmission of sound across a set of panels than a caulked silicone bead.

While particular embodiments of the insert has been shown and described, it will be appreciated by those skilled in the art that changes and modifications may be made thereto without departing from the invention in its broader aspects and as set forth in the following claims.

The invention claimed is:

1. A method of installing a pre-formed resilient, elastomeric insert between two panels, wherein said pre-formed insert comprises a main body portion including a first end and a second end, a first flange portion located on said first end of said main body portion, said first flange portion including at least one lip extending from a side thereof, and a second flange portion located on said second end of said main body portion, said second flange portion including at least one lip, an outer face of at least one of said flange portions having a generally flat outer surface, said method comprising the steps of:
    aligning two panels side-by-side to define a space between the edges of each panel;
    pressing one end of said pre-formed insert into said space from one side of said panels thereby compressing the first flange portion on the one end while pressing the insert into the space; and
    continued pressing of said insert into the space until the first flange portion reaches the other side of the panel and the first flange lip releases and engages the edge of the panel, whereby said generally flat outer face of at least one of said flange portions is relatively flush with one side of said panels,
    wherein said at least one lip of said second flange portion is thicker than said at least one lip of said first flange portion; and
    further wherein said step of pressing said pre-formed insert is conducted until said at least one lip of said second flange portion contacts front surfaces of said panels and said at least one lip of said first flange portion has been pushed completely through said space, thereby reaching rear surfaces of said panels.

2. The method according to claim 1, wherein:
    said at least one lip of said first flange portion comprises two lips, with one lip extending from each side thereof and said at least one lip of said second flange portion also comprises two lips, with one lip extending from each side thereof; and
    further wherein said step of pressing said pre-formed insert is conducted until said lips of said of said second flange portion contact front surfaces of said panels and said lips of said first flange portion have been pushed completely through said space, thereby reaching rear surfaces of said panels.

3. The method according to claim 1, further comprising the steps of:
    removing said insert from said space; and
    re-installing said insert within said space.

4. The method according to claim 1, wherein outer faces of both of said flange portions of said pre-formed insert have generally flat outer surfaces, and further during said step of pressing said pre-formed insert is conducted until said generally flat outer surfaces of both said first flange portion and said second flange portion are relatively flush with associated sides of said panels.

* * * * *